Figure 1:
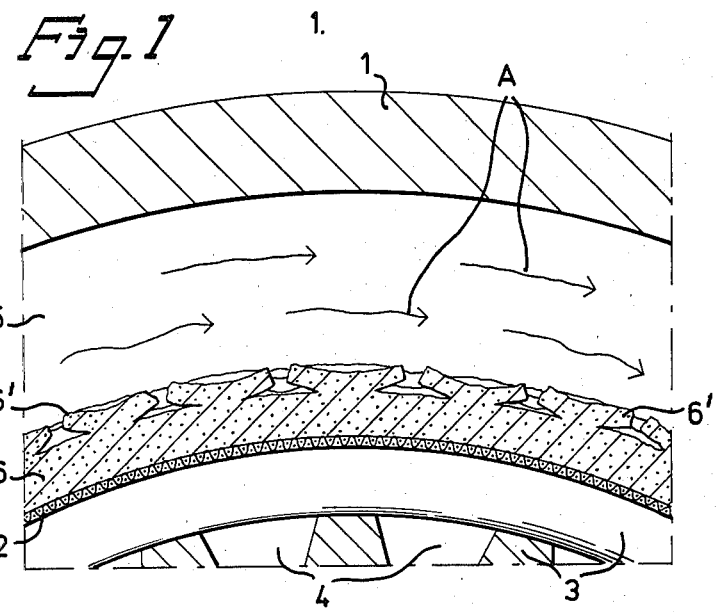

United States Patent [19]

Asp

[11] 4,358,383

[45] Nov. 9, 1982

[54] METHOD OF CLEANING A FILTER SURFACE IN SITU IN A PRESSURE FILTERING APPARATUS FOR LIQUIDS AND PRESSURE FILTERING APPARATUS FOR CARRYING OUT THE METHOD

[76] Inventor: Hans E. Asp, Rud 2658, S-663 02 Hammarö, Sweden

[21] Appl. No.: 232,039

[22] PCT Filed: Jun. 27, 1980

[86] PCT No.: PCT/SE80/00181
§ 371 Date: Feb. 29, 1981
§ 102(e) Date: Jan. 16, 1981

[87] PCT Pub. No.: WO81/00058
PCT Pub. Date: Jan. 22, 1981

[30] Foreign Application Priority Data

Jun. 29, 1979 [SE] Sweden .................... 7905736

[51] Int. Cl.³ .................................... B01D 41/04
[52] U.S. Cl. .................................... 210/771; 210/772; 210/797; 210/332; 210/409
[58] Field of Search ............... 210/771, 791, 797, 798, 210/332, 407, 410, 772, 409

[56] References Cited

U.S. PATENT DOCUMENTS

| | | | |
|---|---|---|---|
| 1,348,159 | 8/1920 | Down | 210/771 |
| 1,801,539 | 4/1931 | Cannon | 210/791 |
| 1,967,197 | 7/1934 | Besselievre | 210/769 |
| 3,794,179 | 2/1974 | Doucet | 210/409 |
| 3,891,551 | 6/1975 | Tiedemann | 210/410 |
| 4,089,781 | 5/1978 | Asp | 210/797 |
| 4,113,618 | 9/1978 | Koseki et al. | 210/798 |
| 4,217,700 | 8/1980 | Müller | 210/771 |
| 4,265,771 | 5/1981 | Lennartz et al. | 210/791 |

FOREIGN PATENT DOCUMENTS 1403928 9/1966 United Kingdom.

*Primary Examiner*—Peter A. Hruskoci
*Attorney, Agent, or Firm*—Fred Philpitt

[57] ABSTRACT

Cleaning a filter surface (16) in situ in a filer housing (10) forming part of a pressure filtering apparatus for liquids is carried out by drying the coating deposited on the filter surface by means of hot air which is caused to flow at a moderate rate through the suspension chamber (5) of the filter housing in a direction over and substantially parallel to the sludge-coated filter surface. The dried coating is detached from the filter surface and removed from the suspension chamber by means of compressed air which alternately with the hot air and at a substantially higher rate than the latter also is caused to flow in a direction over and substantially parallel to the filter surface.

11 Claims, 6 Drawing Figures

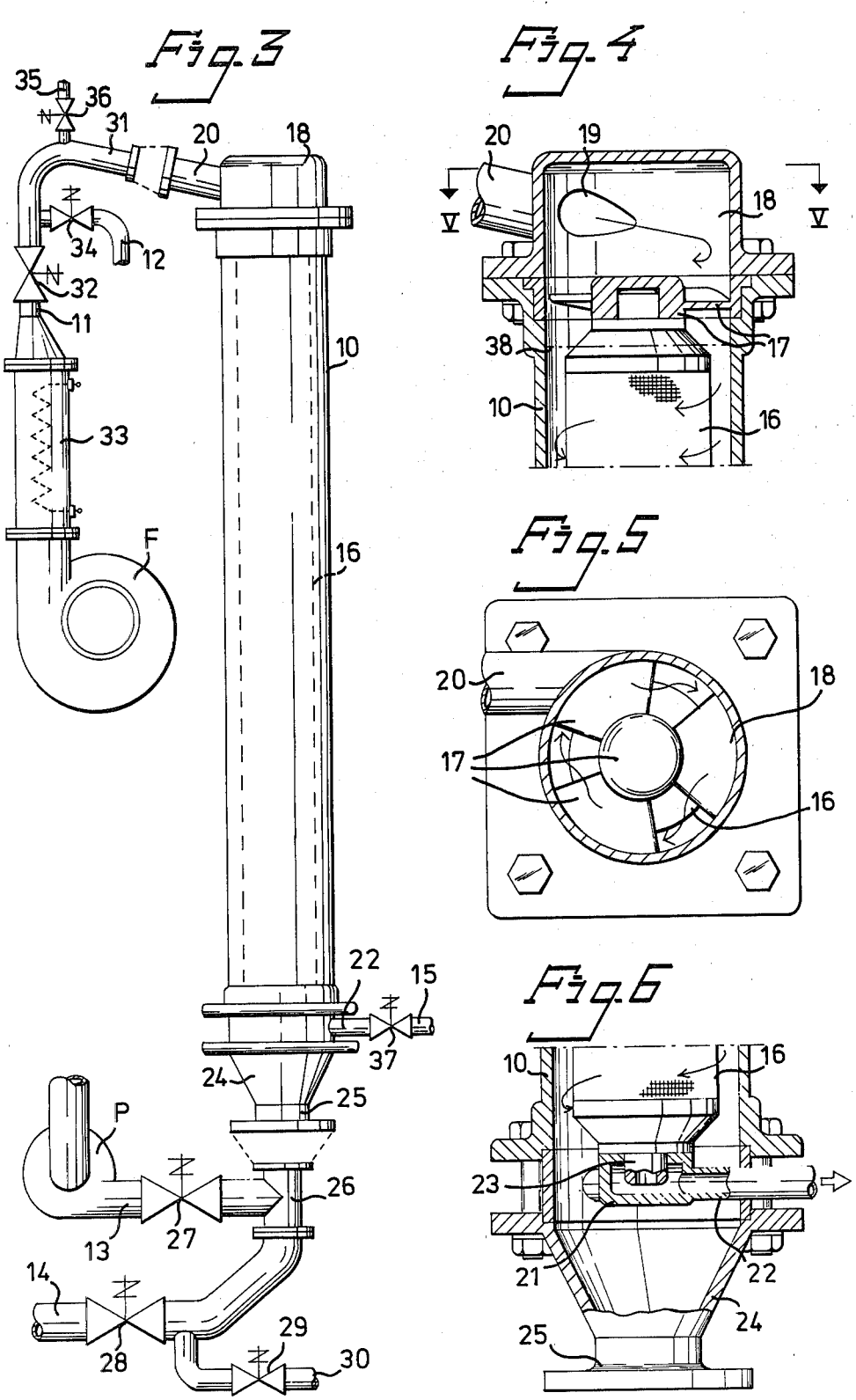

METHOD OF CLEANING A FILTER SURFACE IN SITU IN A PRESSURE FILTERING APPARATUS FOR LIQUIDS AND PRESSURE FILTERING APPARATUS FOR CARRYING OUT THE METHOD

This invention relates to a method of cleaning a filter surface in situ in a pressure filtering apparatus for liquids of the kind, in which the filter surface is at least generally vertically oriented and stationarily mounted in a filter housing for dividing the interior thereof into a suspension chamber and a filtrate chamber, between which chambers a substantial pressure difference is maintained during each filtering procedure in order to separate a filtrate from a liquid suspension supplied to the suspension chamber while leaving on the filter surface a moist coating at least mainly consisting of finely divided solid materials, the cleaning operation comprising the steps of first draining off both the suspension and the filtrate from the filter housing, subsequently drying the coating retained on the filter surface by supplying a gaseous drying medium, preferably air, to the suspension chamber and eventually causing the coating to be detached from the filter surface and to be discharged through an outlet opening located in the lower part of the suspension chamber, the detaching of the coating being promoted by supplying a gaseous cleansing medium, also preferably air, to the filter housing during at least a period of time representing the final stage of the cleaning operation.

The invention is also concerned with a pressure filtering apparatus for carrying out the method, in which apparatus a fine porous filter surface that is at least approximately vertically oriented is stationarily mounted in a filter housing in such a manner as to divide the interior thereof into a suspension chamber and a filtrate chamber each having individual outlet openings, with at least the outlet opening of the suspension chamber being disposed at a level below the filter surface, and in which apparatus at least one inlet opening for a gaseous medium under pressure is provided in the upper part of the suspension chamber.

Filtering liquid suspensions on an industrial scale involves many problems, and for more than a century a great number of more or less successful attempts have been made to solve them. In general, all these problems have one and the same cause, namely the difficulty of removing the coating, the so-called "cake", which is deposited on the filter surface during each filtering procedure and which, when it has reached a certain, frequently rather small thickness of perhaps only a few millimeters, will obstruct the liquid passage up to and through the filter surface so strongly that the capacity of the filter will become entirely insufficient for the existing need. In order to avoid an interruption of the filtering process, it is common practice in such a situation to provide a filtering apparatus with at least two alternatively operating groups of filter housings and to carry out the filtering procedure in one of said groups while acceptable operational conditions are being restored in the other, and vice versa.

Irrespective of whether this practice is applied or not there are only two ways of restoring acceptable operational conditions in the filter housings, namely either by replacing the clogged filter elements by clean and possibly new ones or by cleaning them in situ in the apparatus. Of these two alternatives the last-mentioned one is to be preferred in most cases, although of course, it cannot be applied unless the capacity of the filters actually can be regained to a substantial degree by such a cleaning operation.

During the last decades many different types of filter material have been developed, especially in the form of porous membranes, e.g. of plastics, as well as screens of metal, which are well suited for being cleaned in situ, particularly thanks to the fact that the filter surface is smooth and "fatty" or repellent so that a minimum of coating residues will remain attached after the filter cleaning operation. The invention is based on the use of such filter materials and especially of filter materials having a pore size of up to about 25 microns.

However, the possibility of cleaning the filter elements is not only a matter of the character of the filter surface but also depends on the nature of the liquid suspension or, more specifically, on the nature of the coating of finely divided solid materials depositing on the filter surface. For successfully applying the method defined in the introductory paragraph it is necessary, of course, that the coating consists practically solely of substances which, when being dried, will bake while shrinking into a cake that easily crumbles or disintegrates into flakes or granules as a result of cracking. If the coating contains greater amounts of fibrous substances which are liable to mat together, or substances which become sticky or develop strongly adhesive qualities when the coating dries, such crumbling will not occur and in such a case other, so-called wet methods for cleaning the filter surfaces must be resorted to instead.

A typical example of a previously known application of the so-called dry method of cleaning filter surfaces in situ, which has been referred to in the introductory paragraph, is disclosed in U.S. Pat. No. 1,348,159. In accordance therewith, the drying of the filter coating is accomplished by forcing compressed air, which is supplied to the suspension chamber and is initially used for draining off the suspension and the filtrate from the filter housing, through the coating and the filter surface into the filtrate chamber so as to leave the filter housing solely from said latter chamber. When by means of this air the coating on the filter surface has been dried to a cracked, easily crumbling state, the flow of the compressed air is reversed as an attempt of blowing the filter surface clean from the filtrate chamber side.

As can easily be understood, this known method has several disadvantages. First, it is expensive because it requires substantial quantities of air under high pressure. Secondly, it is slow because solely cold air is utilized and the drying effect will be low until a more extensive formation of cracks has been achieved in the coating. Thirdly, the drying will be randomly irregular because the drying air will mainly seek its way out through the cracks first appearing in the filter coating and, hence, will leave the portions of the coating containing most moisture almost unaffected. Fourthly, the cleansing effect obtained by backward blowing is unreliable because the cracks formed in the coating permit the compressed air to pass almost equally easily in both directions, and thus the purging effect of the cleansing air on the portions of the coating still adhering to the filter surface will be poor.

The aim of the present invention is to teach a dry method of cleaning a filter surface in situ in a pressure filtering apparatus for liquids, which will eliminate the abovementioned disadvantages of the known art and make it possible to restore acceptable operational conditions in a filter housing of the kind mentioned hereinbefore in the shortest possible time and at reasonable cost.

According to the invention this problem is solved by carrying out the cleaning operation in the manner defined in the accompanying claim 1. As will be readily understood therefrom, the invention also takes advantages of the tendency of the coating deposited on the filter surface to shrink and crack when being dried, but—as will also appear from the following—according to the invention the process is carried out under such conditions that the cleaning effect is substantially improved while at the same time the need of forcing air in one or the other direction through the filter surface proper is eliminated.

According to the invention the actual drying is accomplished with only a moderate consumption of air heated to a temperature usually in the vicinity of 150° C., which air ordinarily does not need to have a higher pressure than approximately 2–3 kPa (e) in order to produce the desired velocity of flow of 3 to 6 meters per second and hence it can be delivered by a fan. The drying effect is entirely independent of the permeability of the coating and will therefore be completely controllable. Only the cleansing air, i.e. the medium used for promoting the detachment of the dried flakes from the surface of the filter coating or from the filter surface, as the case may be, has to be delivered by a compressor, a positive air pressure of approximately 600 kPa being satisfactory in most cases in order to obtain a desirable velocity of flow of at least 30 meters per second, and even here the consumption is moderate, because a duration of 3–8 seconds of each cleansing period is normally sufficient and the number of cleansing periods does not have to exceed five other than in exceptional cases.

The cleansing medium may advantageously be used also for pneumatically discharging the dried coating fragments released from the filter surface through the outlet opening of the suspension chamber, whereby the need of mechanical means for this purpose is obviated. The manner in which the dried coating fragments thereafter are taken care of outside of said outlet opening is of no significance to the invention but, if desired, an excessive quantity of cleansing medium that is not needed for achieving the filter cleaning effect may, of course, be used to convey them further to a collecting container which may be located at a rather remote place. However, it is to be noted that the additional consumption of cleansing medium resulting from this type of pneumatic conveyance of the discharged dried fragments has nothing to do with the economy of the filter cleaning process itself.

In pressure filtering apparatus there are frequently used filter elements whose filter surfaces at least generally take the form of a preferably cylindrical surface of revolution having an approximately vertical axis. In such cases the invention is advantageously applied in such a manner that at least the drying medium—and suitably also the cleansing medium—is caused to flow over the filter surface along a substantially helical path, whereby the media will have to flow long distances in contact with the coating to be removed and thus will have an optimum effect in the filter housing.

In the practical application of the method according to the invention it may be necessary in certain cases, namely when the coating on the filter surface has a substantial initial thickness or for other reasons shows a tendency of drying in a stepwise or layer-by-layer fashion from the surface exposed to the drying medium, to let the cleansing medium flow through the suspension chamber during several limited periods of time alternately with the drying medium in order to thereby cause underlying, still moist coating portions to be successively exposed. However, even in such a case the cleaning operation should always be finished off with a forced flow of cleansing medium through the suspension chamber.

The actual cleaning of the filter surface can often to advantage begin with a washing or leaching of the coating thereon, preparatory to the drying of the latter, for the purpose of removing therefrom salts or other components which may act as binding agents or may delay the drying. Such washing, if resorted to, is carried out by supplying to the suspension chamber a vapor, typically steam, which is allowed to condensate therein to thereby leach the coating in liquified form. The condensate with the dissolved coating components is then drained off from the filter housing in an appropriate manner. If introduced under a sufficiently high pressure, the steam thus supplied to the filter housing may also be used for draining off the suspension and the filtrate therefrom, whereby compressed air for this purpose can be dispensed with.

As has been mentioned by way of introduction, the invention is also concerned with a pressure filtering apparatus for carrying out the method. This apparatus presents the characteristic features set forth in the accompanying claim 8, while preferred forms of the apparatus are specified in the claims following thereafter.

Figure 2:
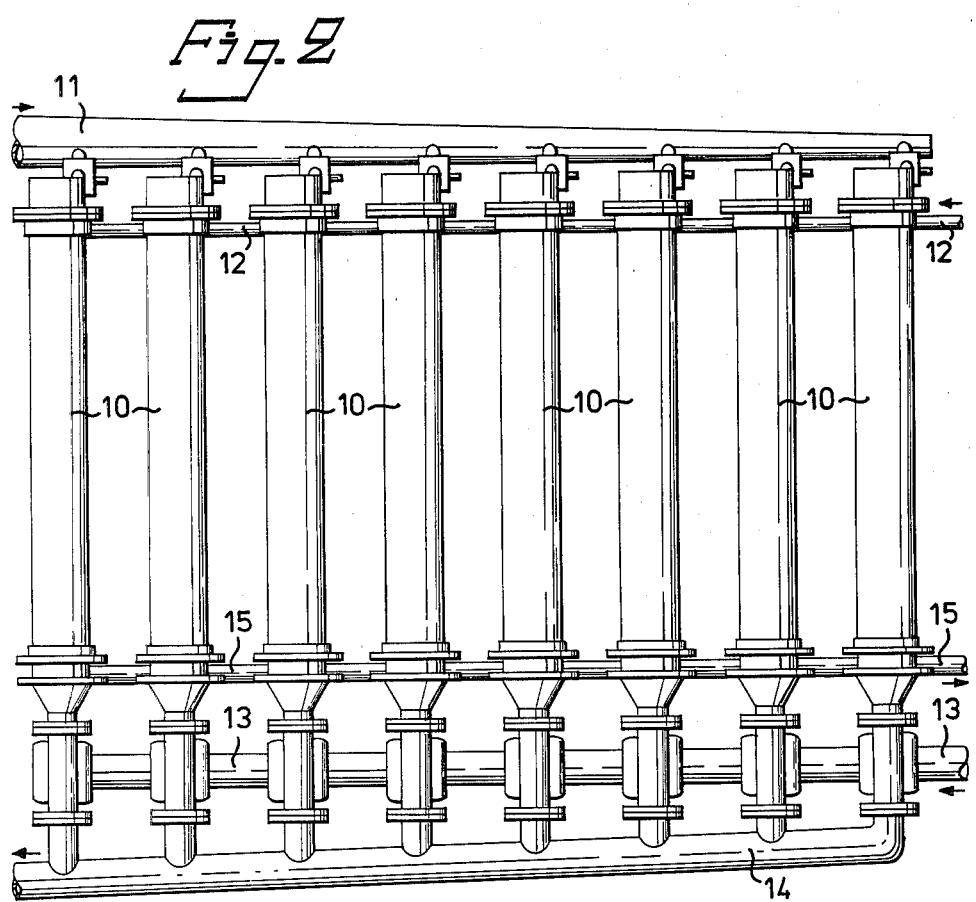

For further elucidation of the invention an embodiment thereof will be more closely described in the following, reference being made therein to the accompanying drawings, in which FIG. 1 is a considerably enlarged fragmentary cross sectional view of a filter housing diagrammatically illustrating a typical example of the reaction of the sludge layer when a drying operation according to the invention is carried out, FIG. 2 shows in a partly simplified manner an example of a pressure filtering apparatus for liquids comprising a plurality of filter housings, in which apparatus the invention is intended to be applied, FIG. 3 is an enlarged side view of one of the filter housings of FIG. 2 showing further in a diagrammatical manner the equipment belonging thereto for supplying the suspension and for cleaning the filter, FIG. 4 is a sectional elevation of the upper part of the filter housing of FIG. 3, FIG. 5 is a horizontal cross section as viewed from the line V—V in FIG. 4, and FIG. 6 is a sectional elevation of the lower part of the filter housing of FIG. 3.

In FIG. 1 numeral 1 indicates the outer cylindrical wall of a filter housing of the general type illustrated in FIGS. 2 and 3, in which housing there is concentrically mounted a filter element comprising a cylindrical, fine porous filter screen 2 supported by a central core or carrier 3, the design of which may vary within wide limits but which always contains communicating cavities forming together at least a part of a central filtrate chamber 4. The filter screen 2 is radially spaced from the wall 1 by an interspace 5 forming a part of the suspension chamber of the filter housing. During each filtering procedure a liquid suspension is supplied under pressure to the suspension chamber and thus to the space 5. The filter screen 2 permits the filtrate to pass to chamber 4 but retains the dispersed substances, or at least a substantial portion thereof, on its outer side, where these substances will gradually form a substantially uniform coating 6, a so-called sludge cake. As this coating 6 successively increases in thickness the capacity of the filter decreases and finally it will become necessary to clean the filter surface, i.e. to remove the coating, typically when the thickness of the layer has reached 3 to 4 millimeters.

As has been pointed out hereinbefore, in accordance with the invention this cleaning is carried out by primarily causing a gaseous drying medium having a temperature exceeding the vaporizing temperature of the dispersion liquid to flow over and substantially parallel to the surface of the coated filter screen 2 through the interspace 5 as is indicated by arrows A in FIG. 1. In order to thereby achieve an optimum drying effect, the radial dimension of the interspace 5, counted from the filter screen 2 to the inside of the wall 1, should not exceed 30 millimeters, and preferably it should be of the order of 8 to 15 millimeters. When being dried the coating 6 will first shrink on the surface and crack while in most cases forming a kind of cuplike or platelike flakes as indicated at 6'. These flakes may have different sizes and thicknesses, depending on the composition of the coating, but practically without exception their edges will curl outwardly in such a manner that the flakes willingly permit themselves to be released and torn away from its base—irrespective of whether the latter consists of an underlying portion of the coating which has not yet dried all through or of the filter screen itself—by a flow of cleansing medium rushing through the interspace 5 at great speed. An additional cleansing effect is achieved by the fact that flakes already carried along by the flow of cleansing medium will mechanically impinge and tear loose flakes which still adhere in the path of the cleansing medium. By alternately supplying cleansing medium and drying medium it is possible in this way to remove step by step even thicker coatings than those previously mentioned from the surface of the filter screen 2.

FIG. 2 shows as an example what a pressure filtering apparatus for liquids, in which the invention is applied, can generally look like. The apparatus comprises eight generally cylindrical filter housings 10 each containing a filter element, and these housings are vertically mounted in slightly spaced side-by-side relationship. Each of the filter housings 10 may at its top be connected through a valve arrangement, which is not illustrated in detail, alternately either to a supply conduit 11 for heated drying air having a fairly low pressure or to a conduit 12 for compressed air having a fairly high pressure, for example 600 kPa (e). At the bottom each of the filter housings 10 may alternatively be connected through a valve arrangement, which not either is shown more in detail, to a common suspension supply conduit 13 and to a discharge conduit 14, respectively. Furthermore, each of the filtrate chambers in the various housings 10 is connected, through individual valves, not shown, to a common filtrate discharge conduit 15.

The manner in which the apparatus of FIG. 2 operates will appear more closely from the following description of operation referring to FIG. 3. However, prior thereto and with specific reference to FIGS. 4 to 6 it is to be mentioned that each filter housing 10 houses a cylindrical filter element 16, the upper end of which is secured to a fixture 17 forming a guide vane. Above this fixture there is a vortex chamber 18 having a tangential and somewhat inclined inlet opening 19 for the gaseous media which have to be supplied through a conduit 20 to the interspace forming the suspension chamber in connection with the cleaning of the filter surface. It should be understood that the vortex chamber 18 with its tangential inlet opening 19 as well as the fixture 17 operating as a guide vane represent means for imparting to the supplied gaseous media a helical movement in a downward direction through the filter housing around the filter element 16 that is centrally mounted therein, and that the provision of one or the other of these means may be sufficient in certain cases.

The lower end of the filter element 16 is secured in a hub-like socket 21 which is hollow and supported in the filter housing 10 by a number of spoke-like arms, of which the one designated by numeral 22 is tubular and forms an outlet conduit for the cavity of the socket 21. At its lower end the filter element 16 has a tubular pin 23 forming an outlet spout for the filtrate chamber 4 (see FIG. 1) in the interior of the filter element 16, and this pin is in a liquid-sealing manner received in the cavity of the socket 21, from which the filtrate thus can flow out through the conduit 22. Below the socket 21 the filter housing 10 tapers at 24 in the form of a funnel towards a flanged connection piece 25 which is intended to connect the suspension chamber of the filter housing to the suspension supply conduit 13 and the discharge conduit 14 (in FIG. 2) through suitable valves and pipes.

As is diagrammatically illustrated in FIG. 3, the connection piece 25 is connected to a T-pipe 26, one branch of which by means of a remote-controlled valve 27 may be opened to the suspension supply conduit 13 through which suspension is supplied under pressure from an arbitrary source by means of a pump P. The other branch of the T-pipe 26 is connected to the discharge conduit 14 through a remote-controlled valve 28 and furthermore through a third remote-controlled valve 29 to a suspension return conduit 30. The conduit 20 at the upper end of the filter housing 10 is in turn through an extension 31 and a valve 32 primarily connected to the hot air conduit 11, which extends from a fan F through a hot air generator 33 which, for example, may be electrically heated. Furthermore a conduit 12 for compressed air from a compressor (not shown) is connected to extension 31 through a valve 34, as is also an additional conduit 35 through a valve 36. Conduit 35 may serve solely as an outlet for air from the interior of the filter housing 10, but it can additionally serve a double purpose so as to alternatively discharge air or permit steam having a certain positive pressure to enter. Finally, there is a further remote-controlled valve 37 between the discharge tube 22 and the filtrate discharge conduit 15.

In carrying out the filtering procedure, the liquid suspension to be strained is supplied through the valve 27, whereas the filtrate is discharged through the valve 37. All the other valves are kept closed. By means of an air cushion formed in the upper portion of the filter housing 10 the suspension is prevented from entering into the vortex chamber 18, but nevertheless the uppermost liquid level should be slightly above the upper edge of the filter surface, approximately at the dash-and-dot line 38 in FIG. 4. When the coating 6 on the filter element 16 has reached such a thickness, say 3 to 4 millimeters, that the filter capacity is no longer satisfactory, the supply of suspension is interrupted by closing valve 27. Instead, valve 29 is opened, while valve 37 is still open, and at the same time valve 34 is temporarily opened in order to drive out the remaining suspension into the return conduit 30 and the remaining filtrate into the conduit 15 with the aid of the compressed air. As soon as this has been accomplished valve 34 is closed again.

As an alternative, valve 36 may be opened instead of air valve 34 and, if so, in order to supply steam under pressure to the interior of the filter housing, this steam being used primarily for driving out the suspension and the filtrate but, in addition, for accomplishing a preparatory washing or leaching of the sludge which is left behind in the filter housing and above all forms the coating on the filter surface. The steam condenses in the filter housing and dissolves salts and possibly also other components contained in the sludge, and the condensate is discharged from the filter housing through valves 29 and 37. The washing is, of course, allowed to continue for the necessary period of time, whereafter the supply of steam is interrupted, i.e. valve 36 is closed.

Besides the steam-washing making possible a purification of the sludge residue and a recovery of soluble salts, which latter frequently may be returned directly to the process in which the sludge is formed, it also offers the further advantage, when the filters included in the apparatus are made of metal, that the danger of corrosive attacks on the filters is reduced. At the increased temperature and in the oxygen-enriched surroundings created by the lively turnover of air which is a consequence of an application of the invention, many salts and other water-soluble substances may develop a substantial corrosivity, and by removing them at an early stage their effects may be avoided.

When the filter housing has been drained—after the sludge being washed, as the case may be—valves 29 and 37 are closed, and instead valves 28 and 32 are opened, whereby heated air, usually having a temperature of about 150° C., will be blown by means of the fan F through the filter housing 10, and more specifically through the suspension chamber thereof formed by the interspace between the outside surface of the filter element 16 and the inside surface of the filter housing 10, at a moderate velocity, preferably 3 to 6 meters per second. As soon as after a few minutes the drying result set forth in connection with FIG. 1 is then usually achieved, and at the same time remaining moisture will also be removed from all other spaces previously occupied by the suspension. Temporarily valve 32 may now be closed and valve 34 be opened for a few seconds in order to let cleansing air flow over the filter surface at a high velocity, preferably at least 30 meters per second, whereafter the hot air drying is continued.

When the remaining coating on the filter element 16 has also been dried, valve 32 is closed again, whereafter valve 34 is opened in order to let the compressed air finally clean the filter surface and simultaneously drive out the released coating in the form of flakes, granules or powder into the discharge conduit 14 and possibly also transfer it to an appropriate collecting container. When this has been done, also the supply of compressed air is interrupted, valve 28 is closed, and a new filtering procedure may be started. At that point first of all valve 27 will be opened in order to again let suspension enter the filter housing, the valve 36 being used whenever necessary in order to let out air and thereby adapt the size of the air cushion formed in the upper part of the filter housing. Valve 37 is also opened for discharging the obtained filtrate. The cleaning of the filter surface is thereafter repeated whenever necessary, usually after a period of time which is determined empirically.

It should be understood that the mode of applying the invention described hereinbefore is only an example which in no way should be considered as limiting for the possibilities of making use of the advantages offered by the invention in practice. As a matter of fact, numerous modifications are possible within the scope of the accompanying claims, particularly with regard to the structure of the filtering apparatus.

I claim:

1. A method of cleaning a filter surface in situ in a pressure filtering apparatus for liquids of the kind in which the filter surface is at least generally vertically oriented and stationarily mounted in a filter housing for dividing the interior thereof into a suspension chamber and a filtrate chamber, between which chambers a substantial pressure difference is maintained during each filtering procedure in order to separate a filtrate from a liquid suspension supplied to the suspension chamber while leaving on the filter surface a moist coating at least mainly consisting of finely divided solid substances, the cleaning operation comprising the steps of
    (A) first draining off both the liquid suspension from the suspension chamber and the filtrate from the filtrate chamber,
    (B) subsequently passing through the suspension chamber a gaseous drying medium which has been heated to a temperature ensuring rapid vaporization of the liquid content of the coating retained on the filter surface while causing said heated drying medium to flow at only moderate velocity along a path extending substantially parallel to the filter surface in a manner to let said drying medium come into superficial contact with the coating thereon in order to thereby effect successive layerwise drying of the coating,
    (C) promoting detachment of dried coating portions from any moist rest of coating still remaining on the filter surface as well as from the filter surface itself by temporarily causing a gaseous cleansing medium to flow through the suspension chamber along substantially the same path as said drying medium but at a substantially higher velocity, and
    (D) removing at least a major portion of detached dried coating from the suspension chamber before again admitting liquid suspension thereto for resumed filtering.

2. The method of cleaning a filter surface as claimed in claim 1 wherein the velocity of flow of said heated gaseous drying medium over the coated filter surface is limited to at most 6 meters per second, whereas the flow velocity of said gaseous cleansing medium is at least 30 meters per second.

3. The method of cleaning a filter surface as claimed in claim 1 for use in a pressure filtering apparatus of the kind in which the filter surface at least generally takes the form of a cylindrical surface of revolution having a substantially vertical axis, wherein at least said heated drying medium when being introduced into the suspension chamber is imparted a whirling motion in order to flow over the filter surface along a substantially helical path.

4. The method of cleaning a filter surface as claimed in claim 1 wherein said cleansing medium is caused to flow through the suspension chamber alternately with said heated drying medium during several limited periods of time.

5. The method of cleaning a filter surface as claimed in claim 1 wherein the draining off of the liquid suspension from the suspension chamber is effected by introducing a gaseous medium under pressure into said chamber.

6. The method of cleaning a filter surface as claimed in claim 1 wherein the coating on the filter surface prior to being dried is washed by supplying steam to the suspension chamber.

7. The method of cleaning a filter surface as claimed in claim 6 wherein the steam is also used for draining the interior of the filter housing.

8. In a pressure filtering apparatus for liquids the combination of
(a) a filter housing,
(b) a filter element having a fine porous filter surface, said filter element being mounted in said filter housing in a stationary position in a manner to have its filter surface substantially vertically oriented and to divide the interior of said filter housing into a suspension chamber and a filtrate chamber, the filter surface of said filter element facing the suspension chamber,
(c) each of said suspension chamber and filtrate chamber having individual outlet openings with at least the outlet opening of the suspension chamber being disposed at a level below the filter surface of said filter element,
(d) means for supplying under pressure a liquid suspension to said suspension chamber,
(e) an tangential inlet opening to said suspension chamber disposed in the upper part thereof,
(f) means for alternately supplying to said inlet opening a heated gaseous drying medium under a relatively lower pressure and a gaseous cleansing medium under a relatively higher pressure, and
(g) means for causing both of said media to flow through said suspension chamber along a path extending substantially parallel and close to the filter surface of said filter element so as to come into superficial contact with any coating formed on said surface.

9. The pressure filtering apparatus as claimed in claim 8 wherein the filter surface of said filter element at least generally takes the form of a cylindrical surface of revolution having a substantially vertical axis, and wherein said means for causing the gaseous media to flow over the filter surface comprise means for imparting to said media a helical motion about the axis of the filter surface.

10. The pressure filtering apparatus as claimed in claim 8 wherein said filter housing has a wall member extending substantially parallel to the filter surface of said filter element and at a distance therefrom that is at most 30 millimeters, the gap thus formed between the filter surface and said housing wall member being a part of said suspension chamber to be passed by said gaseous media.

11. A method of cleaning a filter surface in situ in a pressure filtering apparatus for liquids of the kind in which the filter surface is at least generally vertically oriented and stationarily mounted in a filter housing for dividing the interior thereof into a suspension chamber and a filtrate chamber, between which chambers a substantial pressure difference is maintained during each filtering procedure in order to separate a filtrate from a liquid suspension supplied to the suspension chamber while leaving on the filter surface a moist coating at least mainly consisting of finely divided solid substances, the cleaning operation comprising the steps of
(A) first draining off both the liquid suspension from the suspension chamber and the filtrate from the filtrate chamber,
(B) subsequently passing through the suspension chamber a gaseous drying medium which has been heated to a temperature ensuring rapid vaporization of the liquid content of the coating retained on the filter surface while causing said heated drying medium to flow at a velocity of at most 6 meters per second along a path extending substantially parallel to the filter surface in a manner to let said drying medium come into superficial contact with the coating thereon in order to thereby effect successive layerwise drying of the coating,
(C) promoting detachment of dried coating portions from any moist rest of coating still remaining on the filter surface as well as from the filter surface itself by temporarily causing a gaseous cleansing medium to flow through the suspension chamber along substantially the same path as said drying medium but at a velocity of at least 30 meters per second,
(D) removing at least a major portion of detached dried coating from the suspension chamber before again admitting liquid suspension thereto for resumed filtering, and
(E) said filter surface at least generally taking the form of a cylindrical surface of revolution having a substantially vertical axis, wherein at least said heated drying medium when being introduced into the suspension chamber is imparted a whirling motion in order to flow over the filter surface along a substantially helical path.

* * * * *